(12) United States Patent
Chen et al.

(10) Patent No.: US 11,334,193 B2
(45) Date of Patent: May 17, 2022

(54) TOUCH CONTROL METHOD AND APPARATUS

(71) Applicant: Huawei Technologies Co., Ltd., Shenzhen (CN)

(72) Inventors: Xiaoxiao Chen, Nanjing (CN); Hao Chen, Nanjing (CN); Dezhi Huang, Xi'an (CN); Xuan Zhou, Shenzhen (CN); Bifeng Tong, Nanjing (CN); Shengfeng Zhou, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 16/606,607

(22) PCT Filed: Apr. 21, 2017

(86) PCT No.: PCT/CN2017/081494
§ 371 (c)(1),
(2) Date: Oct. 18, 2019

(87) PCT Pub. No.: WO2018/191972
PCT Pub. Date: Oct. 25, 2018

(65) Prior Publication Data
US 2020/0133458 A1 Apr. 30, 2020

(51) Int. Cl.
*G06F 3/041* (2006.01)
(52) U.S. Cl.
CPC .............................. *G06F 3/04186* (2019.05)

(58) Field of Classification Search
None
See application file for complete search history.

(56) References Cited

U.S. PATENT DOCUMENTS

| | | | |
|---|---|---|---|
| 9,285,989 B2 | 3/2016 | Park et al. | |
| 10,747,428 B2* | 8/2020 | Westerman | G06F 3/04886 |
| 2011/0285645 A1* | 11/2011 | Cho | G06F 3/041661 |
| | | | 345/173 |
| 2012/0075212 A1* | 3/2012 | Park | G06F 3/0488 |
| | | | 345/173 |
| 2012/0242617 A1 | 9/2012 | Lee | |

(Continued)

FOREIGN PATENT DOCUMENTS

| | | |
|---|---|---|
| CN | 103235695 A | 8/2013 |
| CN | 104635985 A | 5/2015 |

(Continued)

*Primary Examiner* — Krishna P Neupane
(74) *Attorney, Agent, or Firm* — Slater Matsil, LLP

(57) ABSTRACT

Embodiments of the present invention provide a touch control method and an apparatus, and relate to the field of communications technologies. The method includes: obtaining, by an electronic device, a touch event triggered by a user on a touchscreen, where the touch event includes a touch position of a touch point; if a target area in which the touch position is located is in a first touch area, determining, by the electronic device, whether the touch point is an accidental touch point, where the first touch area is located on the touchscreen of the electronic device; and discarding, by the electronic device, the touch event when the touch point is an accidental touch point, or reporting, by the electronic device, the touch event when the touch point is not an accidental touch point.

15 Claims, 12 Drawing Sheets

(56) References Cited

U.S. PATENT DOCUMENTS

| | | | |
|---|---|---|---|
| 2013/0234982 A1* | 9/2013 | Kang | .................... G06F 3/0488 345/174 |
| 2014/0160085 A1 | 6/2014 | Rabii et al. | |
| 2016/0328112 A1 | 11/2016 | Jiang et al. | |
| 2017/0277336 A1* | 9/2017 | Yang | ................... G06F 3/04186 |
| 2018/0011600 A1 | 1/2018 | Li et al. | |
| 2018/0081493 A1 | 3/2018 | Wang et al. | |

FOREIGN PATENT DOCUMENTS

| | | | |
|---|---|---|---|
| CN | 104731498 | A | 6/2015 |
| CN | 105045454 | A | 11/2015 |
| CN | 105487809 | A | 4/2016 |
| CN | 106527818 | A | 3/2017 |
| EP | 2434385 | A2 | 3/2012 |
| JP | 2000039964 | A | 2/2000 |
| JP | 2013041629 | A | 2/2013 |
| JP | 2013235586 | A | 11/2013 |
| JP | 2016045524 | A | 4/2016 |
| KR | 20120031806 | A | 4/2012 |
| KR | 20120138056 | A | 12/2012 |
| KR | 20130138880 | A | 12/2013 |
| WO | 2015106416 | A1 | 7/2015 |

\* cited by examiner

TOUCH CONTROL METHOD AND APPARATUS

CROSS-REFERENCE TO RELATED APPLICATIONS

This application is a national stage of International Application No. PCT/CN2017/081494, filed on Apr. 21, 2017, which is hereby incorporated by reference in its entirety.

TECHNICAL FIELD

Embodiments of the present invention relate to the field of communications technologies, and in particular, to a touch control method and an apparatus.

BACKGROUND

Currently, using a touch manner to control to perform a corresponding touch operation on an electronic device has become very popular. However, when the touch operation brings great convenience to a user, an accidental touch operation is easily caused due to sensitivity and perception of a touchscreen. For example, as shown in FIG. 1, when a user holds an electronic device by a right hand and taps a screen, a thenar muscle of a right hand palm is prone to an accidental touch on a functional key disposed in a lower right corner of a touchscreen.

To reduce or avoid an accidental touch operation performed on the electronic device, an anti-accidental touch algorithm may be set in the electronic device. In this way, when obtaining a touch event triggered by a user on the touchscreen, the electronic device may use the anti-accidental touch algorithm to determine whether the touch event is an accidental touch event.

For example, a series of anti-accidental touch parameters are set in the anti-accidental touch algorithm to, for example, determine whether a position of a touch point is in a preset accidental touch area, determine whether a movement trajectory of the touch point is in a preset displacement range, and determine whether duration of the touch point is in a preset time range. When one of the foregoing accidental-touch determining conditions is satisfied, the touch event may be determined as an accidental touch event.

However, different users may have different habits of performing an operation on a touchscreen. For example, for some users, a finger resides on a touchscreen for a relatively long time during a tap, while for some users, a finger resides on a touchscreen for a relatively short time during a tap. Even a same user may have different habits of performing an operation on a touchscreen in different application scenarios. For example, the user may use a left hand to perform an operation on the touchscreen at the beginning, and later use a right hand to perform an operation on the touchscreen. In this case, when an electronic device uses the foregoing accidental touch algorithm, a normal touch event triggered by the user may be determined as an accidental touch event, reducing accuracy of an anti-accidental touch performed by the electronic device.

SUMMARY

Embodiments of the present invention provide a touch control method and an apparatus, to reduce a probability that a touch point is accidentally determined as an accidental touch point due to a change of an application scenario or a change of a touch habit of a user, thereby improving accuracy of an anti-accidental touch performed by an electronic device.

To achieve the foregoing objective, the following technical solutions are used in the embodiments of the present invention:

According to a first aspect, an embodiment of the present invention provides a touch control method, including: An electronic device obtains a touch event triggered by a user on a touchscreen (where the touch event includes a touch position of a touch point). If a target area in which the touch position is located is in a first touch area (where the first touch area is located on the touchscreen of the electronic device), the electronic device may further determine whether the touch point is an accidental touch point, that is, perform an anti-accidental touch operation on the touch point. Then, the electronic device discards the touch event when determining that the touch point is an accidental touch point. Correspondingly, the electronic device may further report the touch event when determining that the touch point is not an accidental touch point, so that subsequently the electronic device performs an operation corresponding to the touch event. In this way, through division of the first touch area on the touchscreen, an accidental-touch point identification operation may be performed in a targeted manner in an area in which an accidental touch point needs to be identified, thereby improving accuracy and efficiency of identifying an accidental touch point.

In a possible design method, the touchscreen of the electronic device further includes a second touch area different from the first touch area, where a probability that an accidental touch event occurs in the second touch area is less than a probability that an accidental touch event occurs in the first touch area. The method further includes: reporting, by the electronic device, the touch event if the target area in which the touch position is located is in the second touch area.

The touchscreen is divided into the first touch area and the second touch area, and probabilities that an accidental touch event occurs in different touch areas are different, that is, different areas have different anti-accidental touch levels. In this way, the electronic device does not need to perform the foregoing anti-accidental touch operation in the second touch area for which the probability of an occurrence of an accidental touch event is relatively small, but directly reports the touch event, thereby improving efficiency of identifying an accidental touch point.

In a possible design method, the method further includes: adjusting, by the electronic device, the target touch area from the second touch area to the first touch area if the electronic device obtains no user operation in the target area within a preset time period. In this way, at different moments and for different user habits, the target area is set as a different touch area having a different risk of an occurrence of an accidental touch event, thereby improving accuracy of identifying an accidental touch point by the electronic device.

In a possible design method, when the touch point is identified as an accidental touch point, after the discarding, by the electronic device, the touch event, the method further includes: determining, by the electronic device, whether the discarded touch event is a misidentification event, where the misidentification event is a trigger event that the electronic device determines a touch point as an accidental touch point when the touch point is not an accidental touch point; and re-sending, by the electronic device, the touch event when the discarded touch event is whether a misidentification event.

In a possible design method, after the determining, by the electronic device, whether the discarded touch event is a misidentification event, the method further includes: when the electronic device determines that the discarded touch event is a misidentification event, obtaining, by the electronic device, a quantity of misidentification times that a misidentification event occurs in the target area within a nearest time period L, where L>0; and adjusting, by the electronic device, the target touch area from the first touch area to the second touch area when the quantity of misidentifications is greater than a threshold.

When a next touch event occurs in the target area, because the target area has been updated to the second touch area, that is, an anti-accidental touch level of the target area has been updated based on a touch habit of the user within the nearest time period L, the electronic device determines, based on an updated anti-accidental touch level of the target area, whether to perform the anti-accidental touch operation. In this way, a misidentification phenomenon can be prevented from occurring for a plurality of times in a same place, thereby reducing a misidentification risk.

In a possible design method, the determining, by the electronic device, whether the touch point is an accidental touch point includes: obtaining, by the electronic device, historical touch data within a nearest time period T, where the historical touch data is used to indicate an actual touch parameter generated for a historical touch point triggered by the user within the nearest time period T, and T>0; determining, by the electronic device based on the historical touch data, a target anti-accidental touch parameter currently used by the electronic device; and identifying, by the electronic device, whether the touch point in the touch event is an accidental touch point by using the target anti-accidental touch parameter.

The historical touch data can reflect a touch habit of the user within the nearest time period T, and touch operations of the user on the touchscreen are usually consecutive. Therefore, the target anti-accidental touch parameter determined based on the historical touch data can also relatively accurately reflect the touch habit of the current user. In this way, accuracy of identifying an accidental touch point by the electronic device by using the target anti-accidental touch parameter will further be improved.

In a possible design method, the historical touch data includes N sets of actual touch parameters that correspond to N historical touch points in a one-to-one manner, and each set of actual touch parameters includes j characteristic values, where N≥1, and j≥1. The determining, by the electronic device based on the historical touch data, a target anti-accidental touch parameter currently used by the electronic device includes: performing, by the electronic device, weighted averaging on the $x^{th}$ characteristic value in each set of actual touch parameters, to obtain the $x^{th}$ characteristic value in a target touch parameter, where the target touch parameter is used to indicate a touch habit of the user within the nearest time period T, and 1≤x≤j; and predicting, by the electronic device, the currently used target anti-accidental touch parameter based on the target touch parameter.

It can be learned that a target anti-accidental touch parameter determined by the electronic device for each accidental touch point may be different. The target anti-accidental touch parameter determined each time is generated based on a latest touch habit of the user. This can meet requirements of different users in different application scenarios for an anti-misidentification operation, thereby improving accuracy of identifying an accidental touch point.

In a possible design method, the determining, by the electronic device, whether the discarded touch event is a misidentification event includes: obtaining, by the electronic device, the historical touch data within the nearest time period T, where the historical touch data is used to indicate an actual touch parameter generated for a historical touch point triggered by the user within the nearest time period T, and T>0; and identifying, by the electronic device, whether the accidental touch point is a misidentification point by using the target anti-misidentification parameter.

It can be learned that a target anti-misidentification parameter determined by the electronic device for each accidental touch point may be different. The target anti-misidentification parameter determined each time is generated based on a latest touch habit of the user. This can meet requirements of different users in different application scenarios for an anti-misidentification operation, thereby improving accuracy of identifying a misidentification point.

In a possible design method, the touchscreen of the electronic device further includes a third touch area, where a probability that an accidental touch event occurs in the third touch area is less than the probability that an accidental touch event occurs in the first touch area and greater than the probability that an accidental touch event occurs in the second touch area. If the target area in which the touch position is located is in the third touch area, the method further includes: determining, by the electronic device when the electronic device currently runs a first application in a display interface, whether the touch point is an accidental touch point; or reporting, by the electronic device, the touch event when the electronic device currently runs a second application in a display interface.

Other than the first touch area and the second touch area, the touchscreen further includes the third touch area, where the probability that an accidental touch event occurs in the third touch area is between the probabilities that an accidental touch event occurs in the first touch area and the second touch area. In this way, when the touch point is in the third touch area, whether to perform the anti-accidental touch operation may be specifically determined based on an application currently run on the electronic device, thereby improving efficiency of identifying an accidental touch point.

According to a second aspect, an embodiment of the present invention provides an electronic device, including: an obtaining unit, configured to obtain a touch event triggered by a user on a touchscreen, where the touch event includes a touch position of a touch point; a determining unit, configured to: if a target area in which the touch position is located is in a first touch area, determine whether the touch point is an accidental touch point, where the first touch area is located on the touchscreen of the electronic device; and an execution unit, configured to: discard the touch event when the touch point is an accidental touch point, or report the touch event when the touch point is not an accidental touch point.

In a possible design method, the touchscreen of the electronic device further includes a second touch area different from the first touch area, where a probability that an accidental touch event occurs in the second touch area is less than a probability that an accidental touch event occurs in the first touch area. The execution unit is further configured to report the touch event if the target area in which the touch position is located is in the second touch area.

In a possible design method, an adjustment unit is configured to adjust the target touch area from the second touch area to the first touch area if the electronic device obtains no user operation in the target area within a preset time period.

In a possible design method, the determining unit is further configured to determine whether the discarded touch event is a misidentification event, where the misidentification event is a trigger event that the electronic device determines a touch point as an accidental touch point when the touch point is not an accidental touch point. The execution unit is further configured to re-send the touch event when the discarded touch event is whether a misidentification event.

In a possible design method, the obtaining unit is further configured to: when the electronic device determines that the discarded touch event is a misidentification event, obtain a quantity of misidentification times that a misidentification event occurs in the target area within a nearest time period L, where L>0. The adjustment unit is further configured to adjust the target touch area from the first touch area to the second touch area when the quantity of misidentifications is greater than a threshold.

In a possible design method, the obtaining unit is further configured to obtain historical touch data within a nearest time period T, where the historical touch data is used to indicate an actual touch parameter generated for a historical touch point triggered by the user within the nearest time period T, and T>0. The determining unit is further configured to determine, based on the historical touch data, a target anti-accidental touch parameter currently used by the electronic device. The execution unit is further configured to determine whether the touch point is an accidental touch point by using the target anti-accidental touch parameter.

In a possible design method, the obtaining unit is further configured to obtain the historical touch data within the nearest time period T, where the historical touch data is used to indicate an actual touch parameter generated for a historical touch point triggered by the user within the nearest time period T, and T>0. The determining unit is further configured to determine, based on the historical touch data, a target anti-misidentification parameter currently used by the electronic device. The execution unit is further configured to determine whether the discarded touch event is a misidentification event by using the target anti-misidentification parameter.

In a possible design method, the touchscreen of the electronic device further includes a third touch area, where a probability that an accidental touch event occurs in the third touch area is less than the probability that an accidental touch event occurs in the first touch area and greater than the probability that an accidental touch event occurs in the second touch area. The execution unit is further configured to: determine, when the electronic device currently runs a first application in a display interface, whether the touch point is an accidental touch point; or report the touch event when the electronic device currently runs a second application in a display interface.

According to a third aspect, an embodiment of the present invention provides an electronic device, including a processor, a memory, a bus, and a communications interface. The memory is configured to store a computer-executable instruction, the processor is connected to the memory by using the bus, and when the electronic device runs, the processor executes the computer-executable instruction stored in the memory, to enable the electronic device to perform the touch control method according to any one of the foregoing possible design methods.

According to a fourth aspect, an embodiment of the present invention provides a computer-readable storage medium. The computer-readable storage medium stores an instruction. When the instruction is run on the electronic device in any one of the foregoing possible design methods, the electronic device is enabled to perform the touch control method according to any one of the foregoing possible design methods.

According to a fifth aspect, an embodiment of the present invention provides a computer program product including an instruction. When the computer program product is run on the electronic device according to any one of the foregoing possible design methods, the electronic device is enabled to perform the touch control method according to any one of the foregoing possible design methods.

In the embodiments of the present invention, the name of the electronic device does not constitute a limitation on devices. During actual implementation, the devices may exist with other names. The devices fall within the scope of the following claims of the present invention and their equivalent technologies provided that functions of the devices are similar to functions of the device in the present invention.

In addition, for technical effects of any design manner in the second aspect to the fifth aspect, refer to technical effects of different design methods in the first aspect or the second aspect. Details are not described herein again.

DETAILED DESCRIPTION OF ILLUSTRATIVE EMBODIMENTS

Figure 1:
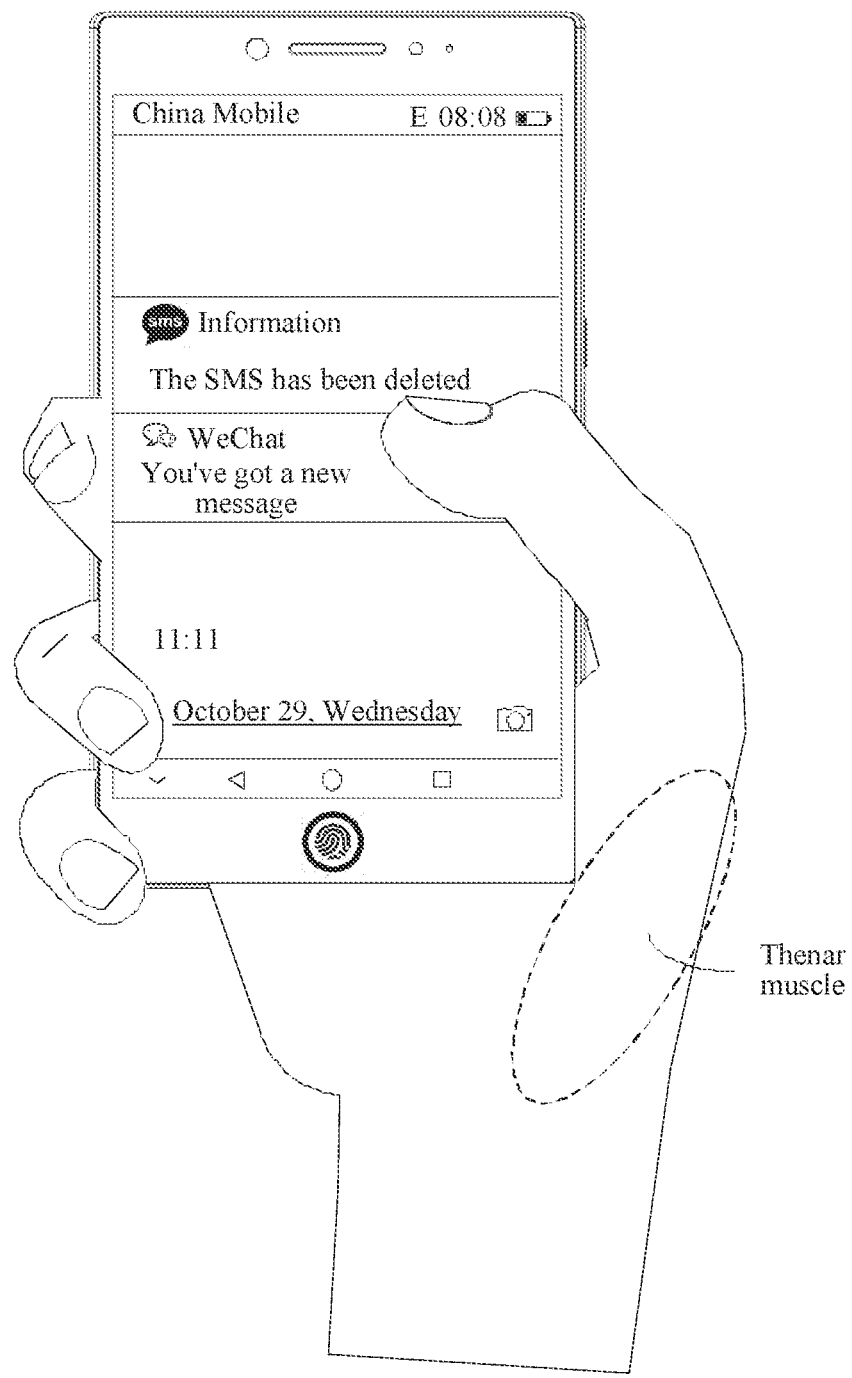
FIG. 1 is a schematic diagram of a possible accidental touch scenario in the prior art.

The terms "first" and "second" mentioned below are merely intended for a purpose of description, and shall not be understood as an indication or implication of relative importance or implicit indication of the quantity of indicated technical features. Therefore, a feature limited by "first" or "second" may explicitly or implicitly include one or more features. In descriptions of embodiments of the present invention, unless otherwise stated, "a plurality of" means two or more.

The embodiments of the present invention provide a touch control method, which can be applied to any electronic device provided with a touchscreen, such as a mobile phone, a wearable device, an AR (augmented reality, augmented reality)\VR (virtual reality, virtual reality) device, a tablet computer, a notebook computer, a UMPC (ultra-mobile personal computer, ultra-mobile personal computer), a netbook, or a PDA (personal digital assistant, personal digital assistant). The embodiments of the present invention impose no limitation thereon.

In a conventional anti-accidental touch process, usually, a set of fixed anti-accidental touch parameters are preset in an electronic device, such as a residence time period (or a residence time range) of a touch point on a screen during a tap, a residence time period (or a residence time range) of a touch point on the screen during a touch and hold, and an anti-accidental touch area in which an anti-accidental touch operation needs to be performed. In this way, when detecting a touch point on the touchscreen, the electronic device may obtain actual touch parameters corresponding to the anti-accidental touch parameters, for example, actual coordinates of the touch point on the screen. In this case, if the actual coordinates are located in the anti-accidental touch area that is set based on the foregoing anti-accidental touch parameters, the electronic device may use the touch point as an accidental touch point, and block related information of the touch point.

However, because the foregoing anti-accidental touch parameters are a set of fixed values, the anti-accidental touch parameters do not apply to all users. For example, for hand shapes of different users, different application scenarios, and touch habits of different users, a touch point is not necessarily an accidental touch point when an actual touch parameter generated for the touch point on a screen does not match the anti-accidental touch parameters.

In this regard, in the touch control method provided in the embodiments of the present invention, when a user triggers a touch event A (for example, a slide operation, a tap operation, or a pinch and stretch operation) on the touchscreen of the electronic device, to determine whether a touch point in the touch event A is an accidental touch point, the electronic device may obtain historical touch data of the user, for example, an actual touch parameter generated for each of N (N≥1) touch points collected within a nearest time period T (T>0). In this way, a target anti-accidental touch parameter used by the electronic device at a current moment may be determined by using the historical touch data. Subsequently, the target anti-accidental touch parameter is then used to identify whether the touch point in the touch event A is an accidental touch point.

The historical touch data can reflect a touch habit of the user within the nearest time period T, and touch operations of the user on the touchscreen are usually consecutive. Therefore, the target anti-accidental touch parameter determined based on the historical touch data can also relatively accurately reflect the touch habit of the current user. In this way, accuracy of identifying an accidental touch point by the electronic device by using the target anti-accidental touch parameter will further be improved.

Figure 2:
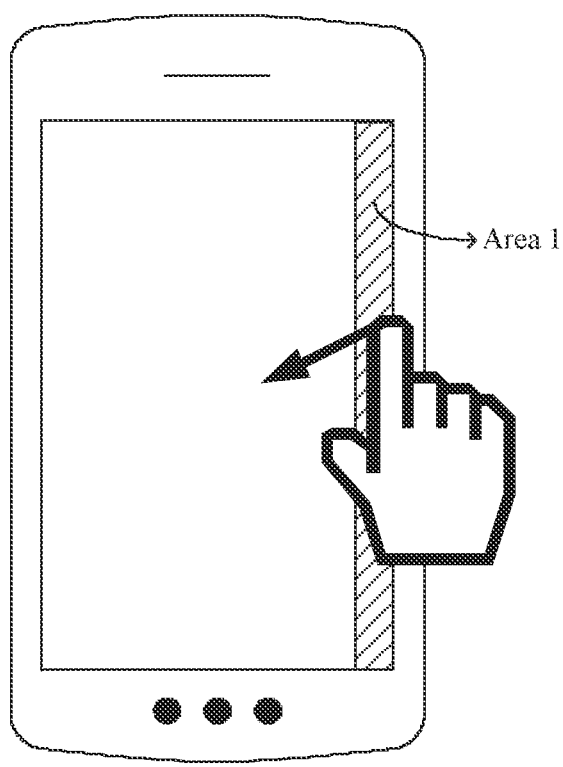
FIG. 2 is a first schematic scenario diagram of a touch control method according to an embodiment of the present invention.

For example, as shown in FIG. 2, when using the electronic device to browse a web page, the user habitually slides from right to left on the screen to complete a page turning operation. Usually, an area 1 located at the right edge of the screen in FIG. 2 is a false operation area preset on the electronic device. In this case, if the prior art is still used, each time when the electronic device detects that there is a touch point in the area 1, the electronic device automatically blocks the touch point. The electronic device reports obtained related information (for example, coordinates of a touch point) of the touch point to a processor only after a finger of the user slides outside a boundary of the area 1. The processor performs a corresponding page turning operation based on the related information of the touch point.

In addition, in the embodiments of the present invention, still as shown in FIG. 2, when detecting a touch point in the area 1 for the first time, the electronic device can still automatically block the touch point as in the prior art. However, moreover, the electronic device further obtains an actual touch parameter when the touch point slides on the touchscreen this time, for example, a displacement of the touch point, or a residence time period of the touch point. In this case, within 10 seconds, the electronic device may detect, for three successive times, a slide operation triggered by the user in a same position. When the electronic device detects a touch point in the area 1 for the fourth time, the electronic device may determine, based on three sets of historical touch data collected within the previous 10 seconds, that in a current target anti-accidental touch parameter, the area 1 does not belong to the false operation area. In other words, there is no need to detect an accidental touch point in the area 1. In this case, the electronic device may immediately report related information of the touch point to the processor. The processor performs a corresponding page turning operation based on the related information of the touch point, thereby improving a response speed of the electronic device.

It can be learned that in the embodiments of the present invention, a target anti-accidental touch parameter used by the electronic device at each different moment is a variable varying with the historical touch data of the user. In this way, in a process of identifying an accidental touch point, a current touch habit of the user and a current application scenario can be better met, thereby obtaining a more accurate anti-accidental touch effect.

In addition, in the touch control method provided in the embodiments of the present invention, the touchscreen of the electronic device may alternatively be divided into different touch areas. Probabilities that an accidental touch event occurs in the different areas may be different. In this regard, a concept of an anti-accidental touch level may be introduced. Different touch areas have corresponding anti-accidental touch levels. When the anti-accidental touch level is higher, a probability that an accidental touch event occurs is higher.

Figure 3:
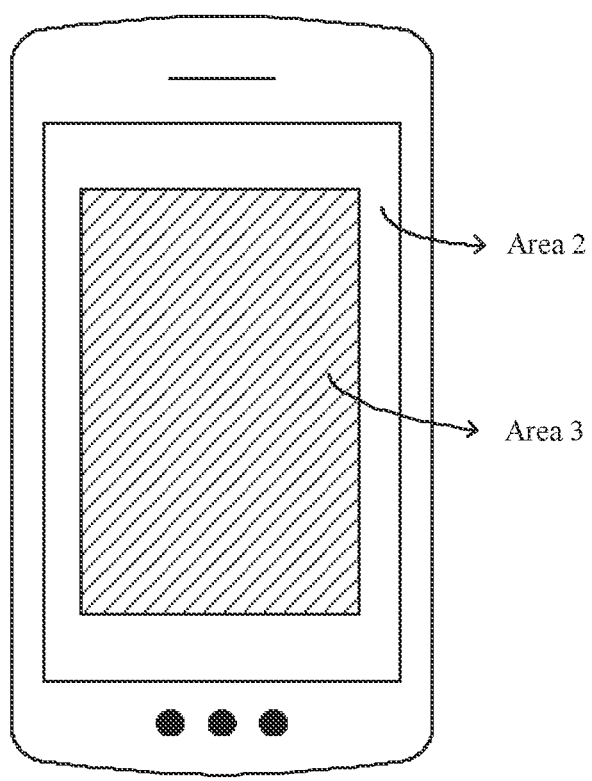
FIG. 3 is a second schematic scenario diagram of a touch control method according to an embodiment of the present invention.

For example, as shown in FIG. 3, an area on the touchscreen may be divided into an area 2 and an area 3. The anti-accidental touch level includes a level 1 (the lowest anti-accidental touch level), a level 2, and a level 3 (the highest anti-accidental touch level). As shown in FIG. 3, an anti-accidental touch level of the area 2 is the level 3. That is, an accidental touch event possibly occurs in the area 2. In this case, the electronic device needs to identify whether a touch point in the area 2 is an accidental touch point, to be specific, needs to perform an anti-accidental touch operation. An anti-accidental touch level of the area 3 is the level 1. That is, an accidental touch event hardly occurs in the area 3. In this case, the electronic device does not need to perform an anti-accidental touch operation on a touch point in the area 3.

The touch areas divided on the touchscreen may be fixed or may be adjusted according to a specific application scenario or user habit. In this case, in a fixed position, for example, a target area in which a touch point is located, when the electronic device runs a first application, the target area may belong to a first touch area having a relatively high probability that a touch event occurs, or when the electronic device runs a second application, the target area may belong to a second touch area having a relatively low probability that a touch event occurs.

In other words, an anti-accidental touch level of each touch area may be fixed or may be adjusted according to a specific application scenario or user habit. The embodiments of the present invention impose no limitation thereon, and details are provided in subsequent embodiments.

In this way, corresponding anti-accidental touch levels may be set for different touch areas on the touchscreen, so as to perform an accidental-touch point identification operation in a targeted manner in an area in which an accidental touch point needs to be identified, thereby improving efficiency of identifying an accidental touch point. In addition, an anti-accidental touch level of any touch area may further be updated to set corresponding anti-accidental touch levels for the touch area at different moments and for different user habits, thereby improving accuracy of identifying an accidental touch point by the electronic device.

Components of the electronic device are specifically described below with reference to FIG. 4.

An RF circuit 21 may be configured to receive and send a signal during an information receiving and sending process or a call process. Particularly, the RF circuit receives downlink information from a wireless access device, then delivers the downlink information to a processor 27 for processing, and sends uplink data to the wireless access device. Usually, the RF circuit includes, but is not limited to, an antenna, at least one amplifier, a transceiver, a coupler, a low noise amplifier (low noise amplifier, LNA), a duplexer, and the like. In addition, the RF circuit 21 may also communicate with a network and another device through wireless communication.

A memory 22 may be configured to store a software program and module. The processor 27 runs the software program and module stored in the memory 22, to execute various functional applications of the electronic device and perform data processing.

An input unit 23 may be configured to: receive input numeral or character information, and generate a key signal input related to a user setting and function control of the electronic device. Specifically, the input unit 23 may include a touchscreen 341 and another input device 342.

A display unit 24 may be configured to display information entered by a user or information provided for a user, and various menus of the electronic device. The display unit 24 may include a display panel 351. Optionally, the display panel 351 may be configured in a form of a liquid crystal display (liquid crystal display, LCD), an organic light-emitting diode (organic light-emitting diode, OLED), or the like.

A camera 25 may also be used as an input device, and is specifically configured to convert a collected analog video or image signal into a digital signal, and further save the digital signal in the memory 22. Specifically, the camera 25 may include a front camera, a rear camera, a built-in camera, an external camera, and the like. The embodiments of the present invention impose no limitation thereon.

The electronic device may further include a gravity sensor (gravity sensor) and other sensors, such as an optical sensor, a gyroscope, a barometer, a hygrometer, a thermometer, and an infrared sensor, and details are not described herein.

An audio circuit 26, a speaker 371, and a microphone 372 may provide audio interfaces between the user and the electronic device. The audio circuit 26 may convert received audio data into an electrical signal and transmit the electrical signal to the speaker 371. The speaker 371 converts the electrical signal into a sound signal for output. In addition, the microphone 372 converts a collected sound signal into an electrical signal. The audio circuit 26 receives the electrical signal, converts the electrical signal into audio data, and outputs the audio data to the RF circuit 21 to send the audio data to, for example, another electronic device, or outputs the audio data to the memory 22 for further processing.

The processor 27 is a control center of the electronic device, and connects various parts of the entire electronic device by using various interfaces and lines. By running or executing the software program and/or module stored in the memory 22, and invoking data stored in the memory 22, the processor 27 performs various functions of the electronic device and processes data, thereby performing overall monitoring on the electronic device. Optionally, the processor 27 may include one or more processing units.

Although not shown, the electronic device may further include a power supply, a WiFi (wireless fidelity, wireless fidelity) module, a Bluetooth module, and the like, and details are not described herein.

Figure 5:
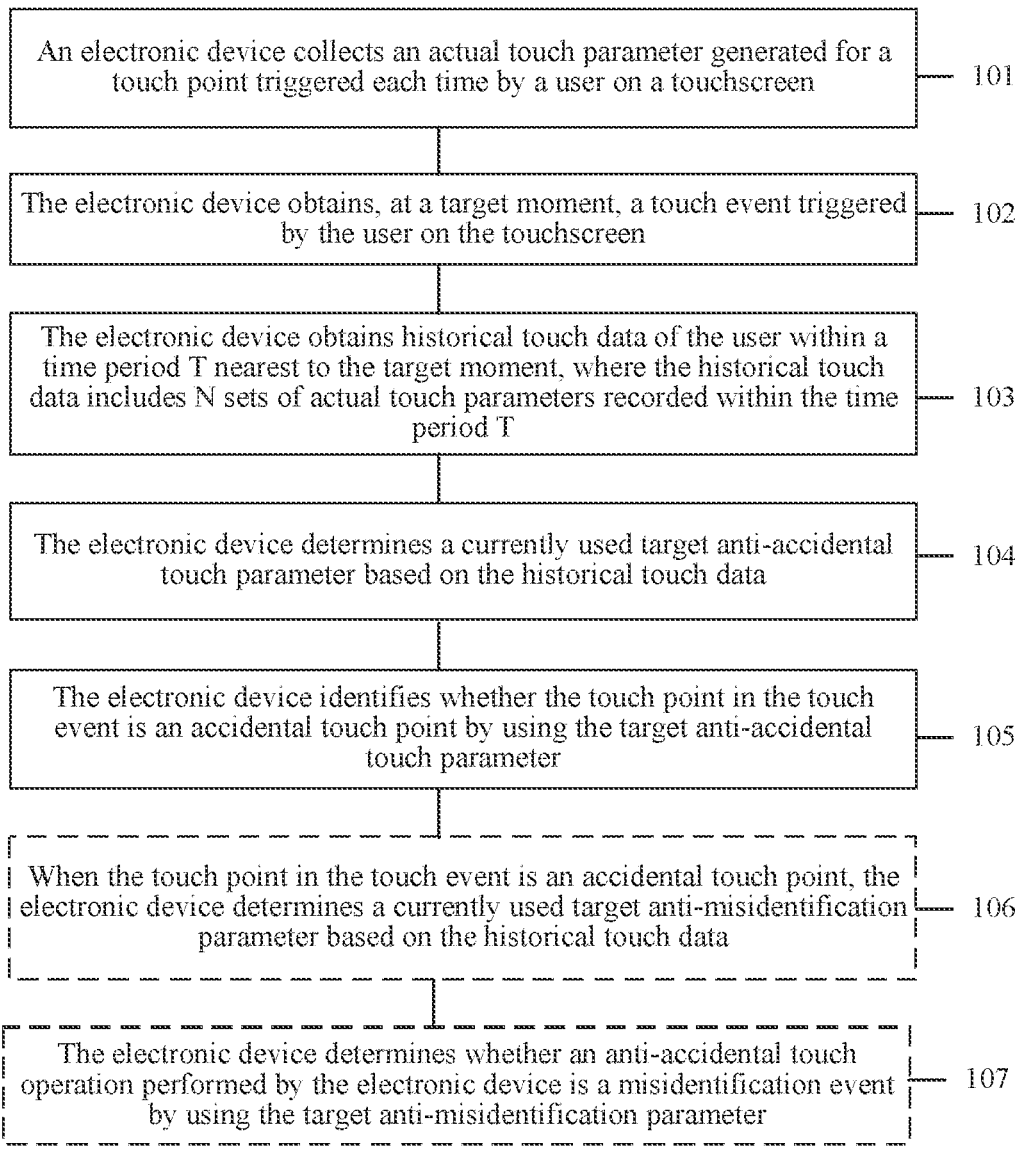
FIG. 5 is a first schematic flowchart of a touch control method according to an embodiment of the present invention.

A touch control method provided in an embodiment of the present invention is described in detail below with reference to specific embodiments. As shown in FIG. 5, the method includes the following steps.

101. An electronic device collects an actual touch parameter generated for a touch point triggered each time by a user on a touchscreen.

Figure 6:
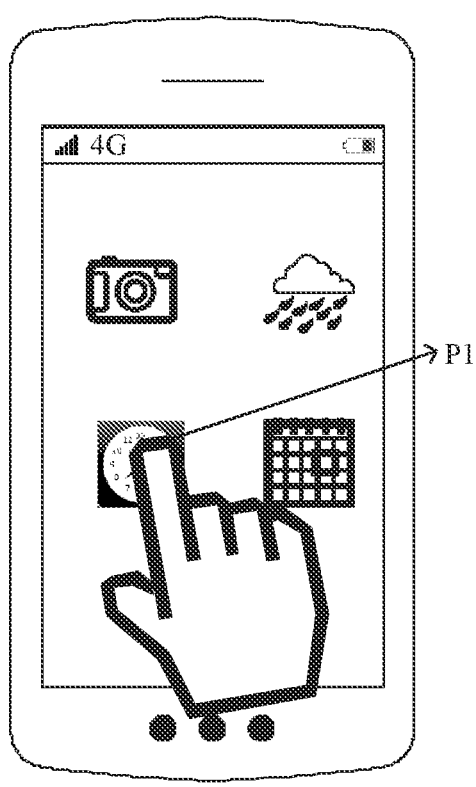
FIG. 6 is a third schematic scenario diagram of a touch control method according to an embodiment of the present invention.
Figure 7:
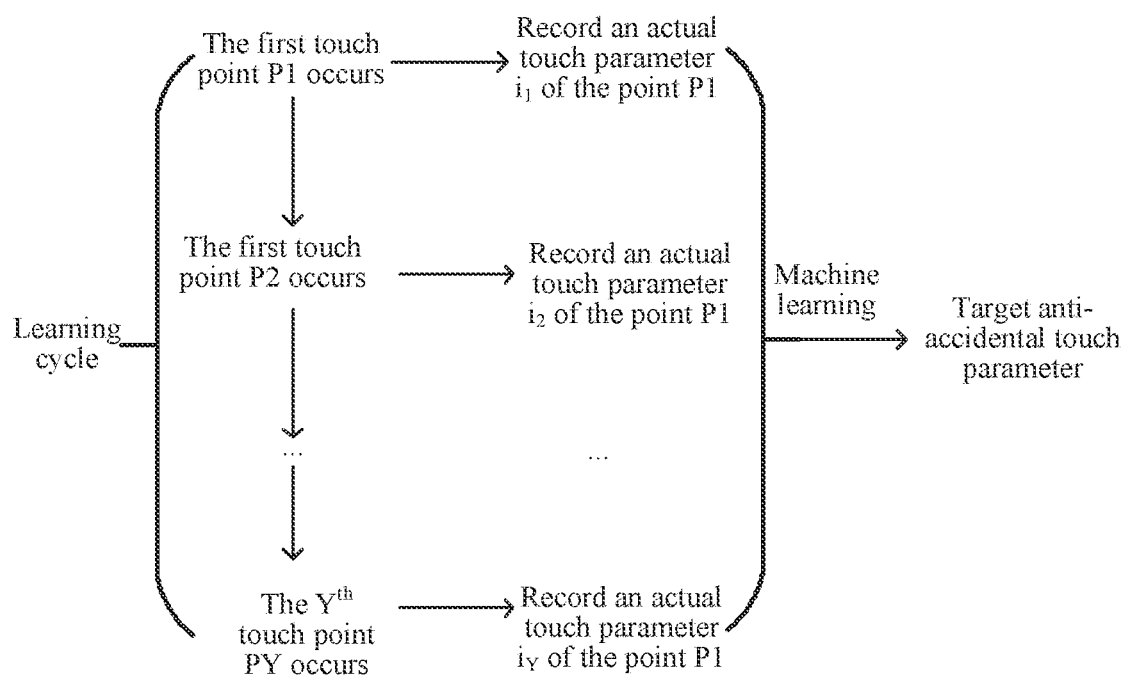
FIG. 7 is a schematic principle diagram of a touch control method according to an embodiment of the present invention.

In step 101, as shown in FIG. 6, when the electronic device detects that there is a touch point (for example, a point P1) on the touchscreen, the electronic device is triggered to track an actual touch parameter generated within a period of time from a time point at which the point P1 falls on the touchscreen to a time point at which the point P1 leaves the touchscreen, for example, the time point at which the point P1 falls on the touchscreen, the time point at which the point P1 leaves the touchscreen, a displacement of the point P1, coordinates of the point P1, and a capacitance signal generated in a position of the point P1. Specific content of the actual touch parameter is not limited in this embodiment of the present invention. The actual touch parameter may be any parameter representing a touch habit of the user.

For example, the actual touch parameter collected by the electronic device each time may be represented by a vector. For example, the point P1 is still used as an example. The collected actual touch parameter $i_1 = X_{11}, X_{12}, \ldots X_{1j}$, where $j > 0$, $X_{11}$ may represent the time point at which the point P1 falls on the touchscreen, $X_{12}$ may represent the time point at which the point P1 leaves the touchscreen, . . . , and $X_{1j}$ may represent the displacement of the point P1.

Figure 8:
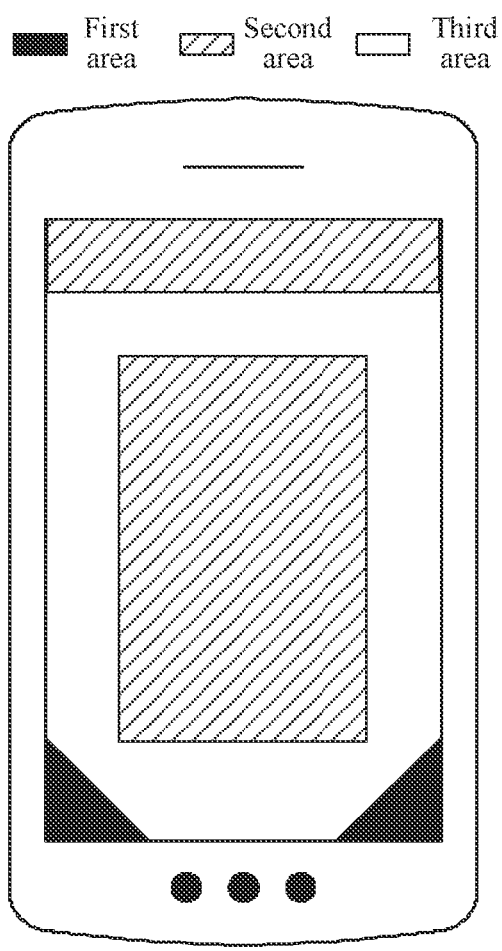
FIG. 8 is a fourth schematic scenario diagram of a touch control method according to an embodiment of the present invention.

Similarly, when detecting a point P2, the electronic device may obtain a corresponding actual touch parameter $i_2=[X_{21}, X_{22}, \ldots X_{2j}]$. In this way, as shown in FIG. 8, a period of time from a time point at which the first touch point falls on the touchscreen to a time point at which the last touch point leaves the touchscreen may be used as a complete learning cycle. The electronic device may obtain Y (Y≥1) sets of actual touch parameters $i_1$ to $i_Y$ in the current learning cycle. Subsequently, after obtaining a touch event, the electronic device may perform machine learning on the Y (Y≥1) sets of actual touch parameters, to learn target anti-accidental touch parameters such as a residence time period (or a residence time range) of a touch point on the screen when the user taps the screen and a residence time period (or a residence time range) of a touch point on the screen during a touch and hold. Because the learned target anti-accidental touch parameters can reflect the touch habit of the user, accuracy of identifying an accidental touch point by the electronic device by using the target anti-accidental touch parameter will further be improved.

102. The electronic device obtains, at a target moment, a touch event triggered by the user on the touchscreen.

In step 102, the electronic device obtains, at the target moment (where the target moment is later than a moment at which the electronic device collects the actual touch parameter of the user for the first time), the touch event triggered by the user on the touchscreen, for example, a tap operation or a slide operation. The touch event includes a touch position of at least one touch point.

103. In response to the touch event, the electronic device obtains historical touch data of the user within a time period T nearest to the target moment, where the historical touch data includes N sets of actual touch parameters recorded within the time period T, T>0, and N≥1.

Then, in step 103, the electronic device may obtain, from Y sets of actual touch parameters obtained in step 101, the N (N≤Y) sets of actual touch parameters collected within the time period T nearest to the target moment. The N sets of actual touch parameters may be used as the historical touch data of the user, and the historical touch data reflects a touch habit of the user on the touchscreen within the nearest time period T. The historical touch data is, for example, a value of a displacement for performing a slide operation, and a size of a hand shape of the user.

In addition, for different application scenarios or different touch events, the electronic device may adjust a specific value of T. For example, when the touch event is a relatively conventional touch event such as a tap operation, the value of T may be set to be larger. In this way, subsequently, the electronic device can determine a more accurate target anti-accidental touch parameter in a relatively wide range of historical touch data. For another example, when the touch event is triggered in a gaming scenario, because touch events triggered in the gaming scenario are all relatively short and concentrated, the value of T may be set to be smaller. In this way, most of the obtained historical touch data is generated in the gaming scenario, and reflects a touch habit of the user when the user plays games on the touchscreen within the nearest time period T. Subsequently, the electronic device can determine, in the historical touch data, a more accurate target anti-accidental touch parameter for the gaming scenario.

104. The electronic device determines a currently used target anti-accidental touch parameter based on the historical touch data.

105. The electronic device identifies whether the touch point in the touch event is an accidental touch point by using the target anti-accidental touch parameter.

Specifically, in step 104, the electronic device may perform machine learning based on the N sets of actual touch parameters obtained in step 103, to obtain a target touch parameter matching the N sets of actual touch parameters.

When N=3, three sets of actual touch parameters are used as an example. An actual touch parameter 1 is $i_1=[X_{11}, X_{12}, \ldots X_{1j}]$, an actual touch parameter 2 is $i_2=[X_{21}, X_{22}, \ldots X_{2j}]$, and an actual touch parameter 3 is $i_3=[X_{31}, X_{32}, \ldots X_{3j}]$. Then, weighted averaging is performed on each characteristic value in the three sets of actual touch parameters to obtain a corresponding characteristic value in the target touch parameter. In this case, the target touch parameter is $Q=[X'_1, X'_2, \ldots X'_j]$, where $X'_1=K_{11}*X_{11}+K_{21}*X_{21}+K_{31}*X_{31}$ and $K_{11}+K_{21}+K_{31}=1$, $X'_2=K_{12}*X_{12}+K_{22}*X_{22}+K_{32}*X_{32}$ and $K_{12}+K_{22}+K_{32}=1$, . . . , and $X'_j=K_{1j}*X_{1j}+K_{2j}*X_{2j}+K_{3j}*X_{3j}$ and $K_{1j}+K_{2j}+K_{3j}=1$.

Similar to the actual touch parameter collected in step 101, $X'_1$ is used to indicate a time point at which the touch point falls on the touchscreen within the nearest time period T, $X'_2$ is used to indicate a time point at which the touch point leaves the touchscreen within the nearest time period T, . . . , and $X'_j$ is used to indicate a displacement of the touch point within the nearest time period T.

In addition, values of $K_{1j}$, $K_{2j}$, $K_{3j}$ may be set to be incremental. That is, a weight of a characteristic value in an actual touch parameter nearer a current time point is larger. In this case, the computed target touch parameter Q is closer to a touch habit of the user at the current time point, and a target anti-accidental touch parameter subsequently predicted by using the target touch parameter Q is more accurate.

In this way, the electronic device can estimate the current target anti-accidental touch parameter based on the target touch parameter Q. For example, if the target anti-accidental touch parameter includes the residence time range of the touch point on the touchscreen, the electronic device may use a difference between the time point $X'_2$ at which the touch point leaves the touchscreen within the nearest time period T and the time point $X'_1$ at which the touch point falls on the touchscreen within the nearest time period T that are in the target touch parameter Q as a residence time period of the touch point on the touchscreen. For example, $X'_1-X'_2=20$. That is, the residence time period is 20 (in units of ms). In this case, when precision is ±5 ms, it may be determined that 20±5 ms is the residence time range in the target anti-accidental touch parameter.

Touch operations of the user on the touchscreen are usually consecutive. Therefore, the target anti-accidental touch parameter (for example, the residence time range) determined based on the historical touch data may relatively accurately reflect the touch habit of the current user. In this way, in step 105, when the residence time period of the touch point in the touch event on the touchscreen in step 102 does not fall within the residence time range of 20±5 ms, the electronic device can determine that the touch point is an accidental touch point.

Certainly, that the residence time range of the touch point on the touchscreen is used as the target anti-accidental touch parameter is merely used as an example. It may be understood that the target anti-accidental touch parameter may be any parameter used to identify an accidental touch point, for example, a time period (or a time range) used by the user to perform a tap operation, a time period (or a time range) used by the user to perform a touch and hold operation, or a capacitance signal of the touch point. This embodiment of the present invention imposes no limitation thereon.

In addition, the electronic device may further classify, based on different touch events, the Y sets of actual touch parameters collected in step 101. For example, Y1 (Y1≤Y) sets of actual touch parameters corresponding to a tap operation are classified as one type, and Y2 (Y2≤Y) sets of actual touch parameters corresponding to a slide operation are classified as one type.

In this case, when the touch event triggered in step 102 is a slide operation, the electronic device may use the actual touch parameters within the nearest time period T in the foregoing Y2 sets of actual touch parameters as the historical touch data. In this way, when determining the target anti-accidental touch parameter based on the historical touch data, the electronic device may generate different target anti-accidental touch parameters in a targeted manner based on a type of the touch event, to improve accuracy in an anti-accidental touch identification process.

It should be noted that step 102 to step 105 are described by using only one touch event as an example. It may be understood that the touch control method in step 102 to step 105 may be continually cyclical. In this case, a target anti-accidental touch parameter determined by the electronic device for each touch event may be different. The target anti-accidental touch parameter determined each time is generated based on a latest touch habit of the user. This can meet requirements of different users in different application scenarios for an anti-accidental touch operation.

106. (Optional) When the touch point in the touch event is an accidental touch point, the electronic device determines a currently used target anti-misidentification parameter based on the historical touch data.

107. (Optional) The electronic device determines whether the anti-accidental touch operation performed by the electronic device is a misidentification event by using the target anti-misidentification parameter.

The misidentification event is a trigger event that the electronic device cannot respond to a touch point because the electronic device determines the touch point as an accidental touch point when the touch point is not an accidental touch point. The misidentification point is a touch point which is not an accidental touch point but is determined as an accidental touch point by the electronic device.

To avoid a misidentification event, after determining that one touch point is an accidental touch point, the electronic device may continue to detect an actual touch parameter of the accidental touch point, such as a movement trajectory or a tap time period, and further, compare the actual touch parameter with a preset anti-misidentification parameter. For example, a threshold of one displacement is set in the anti-misidentification parameter. When a value of a displacement obtained in the actual touch parameter exceeds the threshold, the accidental touch point may be determined as a misidentification point, so as to re-send related information of the touch point in the touch event that is accidentally considered as the accidental touch point.

In this embodiment of the present invention, similar to the target anti-accidental touch parameter, the electronic device may further determine, based on the historical touch data of the user, a target anti-misidentification parameter that satisfies the touch habit of the current user.

The target anti-misidentification parameter is one or more parameters (or parameter intervals) used by the electronic device to determine whether an accidental touch point is a misidentification point. The target anti-accidental touch parameter is one or more parameters (or parameter intervals) used by the electronic device to determine whether a touch point is an accidental touch point.

A difference lies in that the parameters in the target anti-misidentification parameter may be different from those in the target anti-accidental touch parameter. Alternatively, some parameters may be different. For example, the target anti-accidental touch parameter may include a time period (or a time range) in which the user performs a tap operation, or a time period (or a time range) in which the user performs a touch and hold operation. The target anti-misidentification parameter may further include a size of the hand shape of the user and the like.

Similar to step 104, in step 106, the electronic device can still perform machine learning based on the historical touch data, that is, the N sets of actual touch parameters, obtained in step 103, to obtain a target touch parameter $Q=[X'_1, X'_2 \ldots X'_j]$ matching the N sets of actual touch parameters.

In this case, that the size of the hand shape of the user is the target anti-accidental touch parameter is used as an example. The electronic device may determine the size of the hand shape of the user based on a capacitance signal of the touch point in the target touch parameter Q.

In this way, in step 107, the electronic device may compare the size of the hand shape of the user in the touch event with the size of the hand shape of the user in the target anti-misidentification parameter. When similarity between the two sizes is less than a threshold, the electronic device may determine that the touch point in the touch event is not a misidentification point, that is, the touch point in the touch event is exactly an accidental touch point. Otherwise, the electronic device may determine that the touch point in the touch event is a misidentification point.

It can be learned that a target anti-misidentification parameter determined by the electronic device for each accidental touch point may be different. The target anti-misidentification parameter determined each time is generated based on a latest touch habit of the user. This can meet requirements of different users in different application scenarios for an anti-misidentification operation, thereby improving accuracy of identifying a misidentification point.

Certainly, if the target anti-misidentification parameter is the same as the target anti-accidental touch parameter, the electronic device may directly use the target anti-accidental touch parameter determined in step 104 as the target anti-misidentification parameter in step 106. Alternatively, one or more parameters in the target anti-misidentification parameter are the same as one or more parameters in the target anti-accidental touch parameter. In this case, the electronic device only needs to determine a parameter different from that in the target anti-accidental touch parameter. This embodiment of the present invention imposes no limitation thereon.

This embodiment of the present invention provides a touch control method. In the method, the touchscreen of the electronic device may be divided into one or more touch areas. Each touch area has a corresponding anti-accidental touch level. When the anti-accidental touch level is higher, a probability that an accidental touch event occurs in the touch area is larger.

For example, as shown in FIG. 8, the touchscreen may be divided into three touch areas: a first area, a second area, and a third area. The first area is located in a lower left corner and a lower right corner of the touchscreen in a portrait state, the second area is located in an upper boundary of the touchscreen in the portrait state and a center area of the touchscreen, and the third area is a part different from the first area and the second area.

Usually, an accidental touch easily occurs in the first area. Therefore, an anti-accidental touch level of the first area may be set as a level 3 (assuming that the anti-accidental touch level includes a level 1, a level 2, and the level 3, the level 3 is the highest level, and the level 1 is the lowest level). Usually, no accidental touch occurs in the second area. Therefore, an anti-accidental touch level of the second area may be set as the level 1. An accidental touch may occur or may not occur in the third area. Therefore, an anti-accidental touch level of the third area may be set as the level 2.

The anti-accidental touch level is directly related to whether to perform an anti-accidental touch operation. When the anti-accidental touch level is relatively high, for example, the anti-accidental touch level of the first area is the level 3, the electronic device needs to perform an anti-accidental touch operation on a touch point occurring in the area, that is, needs to identify whether the touch point is an accidental touch point. When the anti-accidental touch level is relatively low, for example, the anti-accidental touch level of the second area is the level 1, the electronic device does not need to perform an anti-accidental touch operation on a touch point occurring in the area. When the anti-accidental touch level is the level 2, the electronic device may reduce frequency of performing an anti-accidental touch operation or relax a condition of performing an anti-accidental touch operation. Alternatively, the electronic device may further determine, according to a condition such as a user setting or a specific application scenario, whether to perform an anti-accidental touch operation.

For example, the first area may be referred to as a red area. When the touch point in the touch event falls in the red area, the electronic device needs to identify whether the touch point is an accidental touch point. The second area may be referred to as a green area. When the touch point in the touch event falls in the green area, the electronic device does not need to identify whether the touch point is an accidental touch point, but directly reports the touch event to a processor. The processor further performs only an operation corresponding to the touch event. In addition, the third area may be referred to as a yellow area. When the touch point in the touch event falls in the yellow area, the electronic device may determine, based on a currently-executed specific application, whether to identify whether the touch point is an accidental touch point.

In this way, corresponding anti-accidental touch levels may be set for different touch areas on the touchscreen, so as to perform an anti-accidental touch operation in a targeted manner in an area in which an accidental touch point needs to be identified, thereby improving efficiency of identifying an accidental touch point.

Further, the anti-accidental touch level of any one of the foregoing areas may be fixed. For example, the anti-accidental touch level of the first area may be always set as the level 3, and the anti-accidental touch level of the second area may be always set as the level 1. Alternatively, the anti-accidental touch level of any one of the foregoing areas may be adjusted in real time by the electronic device based on the touch habit of the user. For example, the anti-accidental touch level of the third area may be set as the level 3 by default. When no misidentification event occurs in the third area within a preset time period, the anti-accidental touch level of the third area may be lowered to the level 2.

Certainly, division of the areas and shapes and sizes of the areas may alternatively be set or adjusted by a person skilled in the art. This embodiment of the present invention imposes no limitation thereon.

Figure 9:
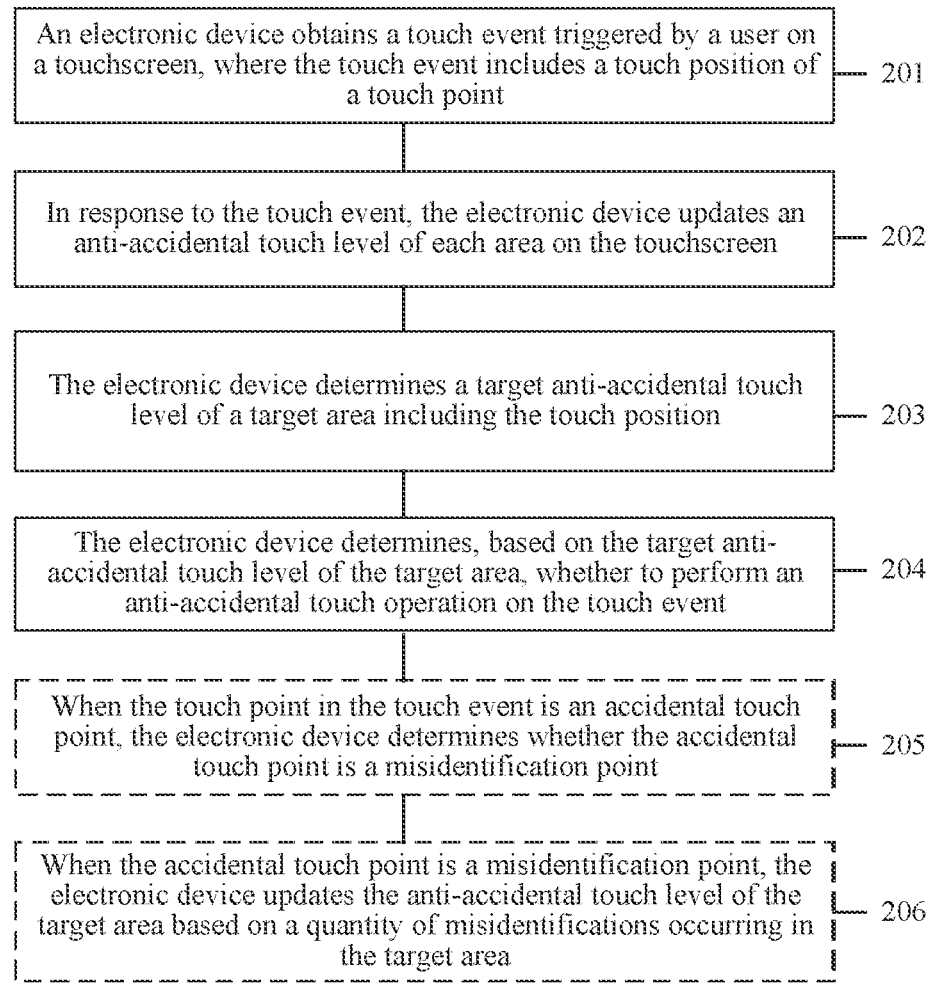
FIG. 9 is a second schematic flowchart of a touch control method according to an embodiment of the present invention.

Based on a security mechanism for the foregoing anti-accidental touch level, an embodiment of the present invention provides a touch control method. As shown in FIG. 9, the method includes the following steps.

201. An electronic device obtains a touch event triggered by a user on a touchscreen, where the touch event includes a touch position of a touch point.

Figure 10:
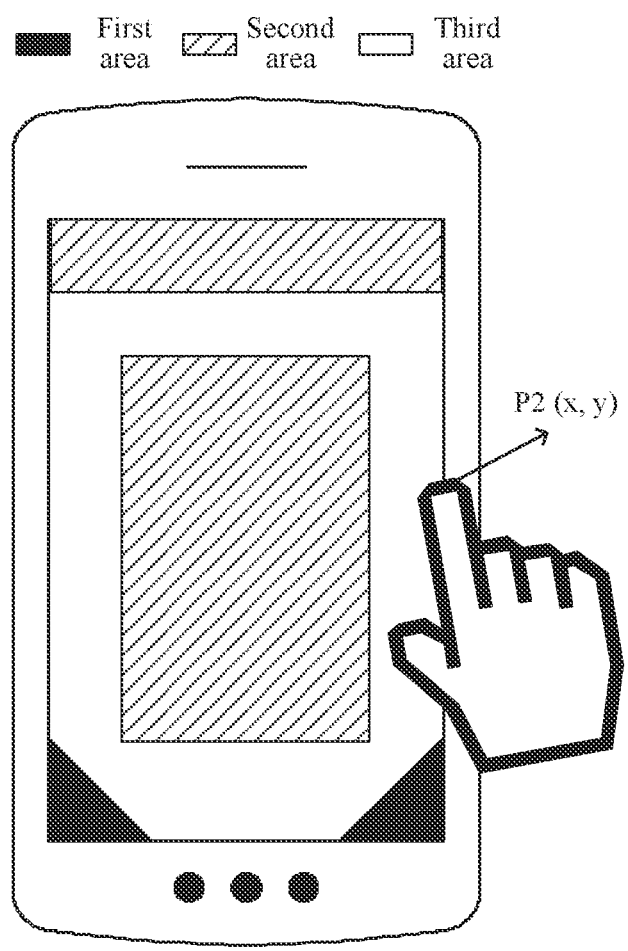
FIG. 10 is a fifth schematic scenario diagram of a touch control method according to an embodiment of the present invention.

In step 201, the user triggers a touch event on the touchscreen of the electronic device. After detecting the touch point (for example, a point P2 shown in FIG. 10) in the touch event, the electronic device may determine a touch position, for example, coordinates P2 (x,y) of the point P2, of the touch point based on a change of a capacitance signal on the touchscreen.

202. In response to the touch event, the electronic device updates an anti-accidental touch level of each area on the touchscreen.

Using the first area, the second area, and the third area in FIG. 8 as an example, each time when detecting a touch event, the electronic device updates the anti-accidental touch levels of the three areas at a current moment.

The anti-accidental touch levels of the first area and the second area may be fixed. In this case, in step 202, updated anti-accidental touch levels of the first area and the second area are the same as the anti-accidental touch levels of the first area and the second area before update. To be specific, the anti-accidental touch level of the first area is still the level 3, and the anti-accidental touch level of the second area is still the level 1.

The anti-accidental touch level of the third area may change over time. In other words, the anti-accidental touch level that is set for the third area each time is temporary. When the anti-accidental touch level of the third area is the level 1, after a time period T1 (T1>0), a risk that an accidental touch event occurs in the third area increases. Therefore, the anti-accidental touch level of the third area may be updated to the level 2. Similarly, when the anti-accidental touch level of the third area is the level 2, after a time period T2 (T2>0), the anti-accidental touch level of the third area may be updated to the level 3.

For example, the anti-accidental touch level of the third area is originally the level 1. When detecting the foregoing touch event, the electronic device may compute a time difference between a trigger time of the touch event and a refresh time of last update of the anti-accidental touch level of the third area. When the time difference is greater than T1, the anti-accidental touch level of the third area may be updated to the level 2. That is, in this case, a probability that an accidental touch occurs in the third area increases to some extent.

Certainly, the user may alternatively manually set the anti-accidental touch level of each area or update a rule for the anti-accidental touch level of each area. Alternatively, the electronic device may update the anti-accidental touch level of each area according to an instruction or data sent by a server, for example, a target anti-accidental touch parameter or a target anti-misidentification parameter that is used by 90% of users and pushed by the server. This embodiment of the present invention imposes no limitation thereon.

203. The electronic device determines an anti-accidental touch level of a target area including the touch position.

Figure 11:
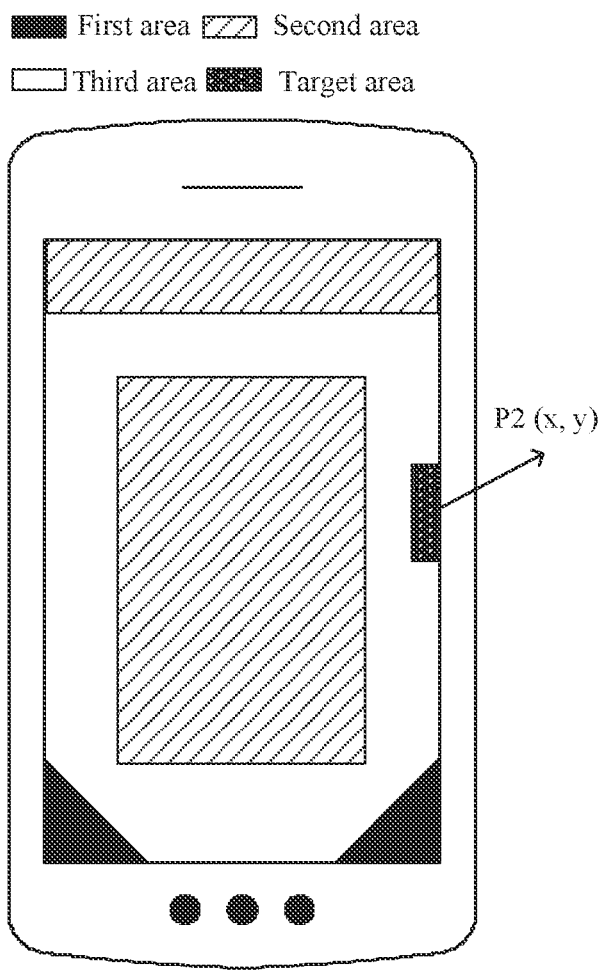
FIG. 11 is a sixth schematic scenario diagram of a touch control method according to an embodiment of the present invention.

Specifically, because the touch position P2 (x,y) of the touch point P2 has been obtained, as shown in FIG. 11, an area having a preset size and including the point P2 may be used as the target area. In this case, in step 203, the anti-accidental touch level of the target area may further be determined. As shown in FIG. 1*i*, the target area is in the third area, and the anti-accidental touch level of the third area has been updated to the level 2. In this case, the anti-accidental touch level of the target area may be determined as the level 2.

Still as shown in FIG. 1*i*, when the point P2 is located at an edge of the touchscreen, a (circle or rectangle) area within a radius of R (R>0) around the point P2 may be used as the target area. Alternatively, when the point P2 is located at the center of the touchscreen, an area formed by a plurality of pixels (for example, 30*30 pixels) using the point P2 as a center may be used as the target area. This embodiment of the present invention imposes no limitation thereon.

204. The electronic device determines, based on the target anti-accidental touch level of the target area, whether to perform an anti-accidental touch operation on the touch event.

For example, when the anti-accidental touch level is the level 3, the electronic device performs an anti-accidental touch operation on the touch event.

When the anti-accidental touch level is relatively low and is the level 1, the electronic device does not perform an anti-accidental touch operation on the touch event, but reports related information of the touch point in the touch event to a module such as a processor of the electronic device. Subsequently, the processor performs a corresponding operation, for example, an unlock operation, based on the related information of the touch point.

When the anti-accidental touch level is the level 2, the electronic device may reduce frequency of performing an anti-accidental touch operation, for example, may perform an anti-accidental touch operation at 50% of original frequency, that is, perform an anti-accidental touch operation on any one of two obtained touch points. Alternatively, relative to an anti-accidental touch parameter used by the electronic device to perform an anti-accidental touch operation in a case of the level 1, the electronic device may adjust the anti-accidental touch parameter, to relax a condition of performing an anti-accidental touch operation. For example, the electronic device may adjust a tap time period from 20 ms to 30 ms. In this case, when a residence time period of the touch point on the touchscreen is greater than 30 ms, the electronic device determines the touch point as an accidental touch point. Alternatively, the electronic device may further determine, based on a current application scenario, whether to perform an anti-accidental touch operation. For example, when an application having no high requirement on touch precision is running in a display interface of the electronic device, the electronic device does not need to perform an anti-accidental touch operation on the touch event, and may directly report the touch event. When an application having a relatively high requirement on touch precision is running in the display interface of the electronic device, the electronic device performs an anti-accidental touch operation on the touch event.

For a method used by the electronic device to perform an anti-accidental touch operation on the touch event, refer to related descriptions in step 101 to step 105, and details are not described herein again.

205. (Optional) When the touch point in the touch event is an accidental touch point, the electronic device determines whether the accidental touch point is a misidentification point.

206. (Optional) When the accidental touch point is a misidentification point, the electronic device updates the anti-accidental touch level of the target area based on a quantity of misidentifications occurring in the target area.

As described in step 106, in step 205, after determining that the touch point in the touch event is an accidental touch point, the electronic device may continue to detect an actual touch parameter of the touch point, and compare the actual touch parameter with a preset anti-misidentification parameter, so as to determine whether the touch point is a misidentification point.

For a method used by the electronic device to perform an anti-misidentification operation on the touch point in the touch event, refer to related descriptions in step 106 and step 107, and details are not described herein again.

Further, if the touch point is a misidentification point, it indicates that a fault occurs in the anti-accidental touch operation performed in step 204. In this case, the electronic device may record a misidentification time at which the touch point is determined as a misidentification point.

In this case, in step 206, the electronic device may obtain a quantity of times that a misidentification event (that is, an accidental touch point is determined as a misidentification point) occurs in the target area within a nearest time period L (L>0). If the quantity is greater than a threshold, it indicates that touch behavior of the user in the target area is normal behavior of the user. Therefore, the electronic device may reduce the anti-accidental touch level of the target area.

For example, still as shown in FIG. 1l, the anti-accidental touch level of the target area is 3 (that is, the target area belongs to a red area), after the user triggers a touch event in the target area, if the electronic device determines that a touch point in the touch event is an accidental touch point, the electronic device may further perform an anti-misidentification operation on the touch point. In this case, if determining that the accidental touch point is a misidentification point, the electronic device further obtains a quantity of misidentifications occurring in the target area within the nearest time period L. If three (or more than three) successive misidentifications occur in the target area, it indicates that the user intentionally touches the point P2 rather than accidentally touches the point P2. Therefore, the electronic device may lower the anti-accidental touch level of the target area from the level 3 to the level 1 (that is, lower the target area from the red area to a green area). In this way, when a next touch event occurs in the target area, because the anti-accidental touch level of the target area has been updated to the level 1, the electronic device does not need to perform an anti-accidental touch operation on the current touch event. In this way, a misidentification phenomenon can be prevented from occurring for a plurality of times in a same place, thereby reducing a misidentification risk.

Further, in step 206, that is, after updating the anti-accidental touch level of the target area based on the quantity of misidentifications, the electronic device may further record a refresh time of update of the anti-accidental touch level of the target area. For example, the anti-accidental touch level of the target area is the level 2. When the quantity of misidentifications is greater than a preset threshold, the electronic device updates the anti-accidental touch level of the target area to the level 1, and records a current time as a refresh time at which the anti-accidental touch level of the target area is updated to the level 1. When the quantity of misidentifications is less than or equal to the preset threshold, the electronic device still keeps the anti-accidental touch level of the target area to be the level 2, and records a current time as a refresh time at which the anti-accidental touch level of the target area is updated to the level 2.

In this way, when a next touch event is subsequently detected in the target area, similar to step 202, the electronic device may update the anti-accidental touch level of the target area based on a time difference between the refresh time and a trigger time of the touch event.

It should be noted that the anti-accidental touch level in step 201 to step 206 may be set and updated for one or more application scenarios. For example, when running an application A, the electronic device divides the touchscreen of the electronic device into the different areas shown in FIG. 1i, and learns, according to step 201 to step 206, a touch habit of the user when running the application A, to update the corresponding anti-accidental touch levels for the different areas. When running an application B, the electronic device may discard the anti-accidental touch level of each area that is obtained when running the application A, and further learn, according to step 201 to step 206 again, a touch habit of the user when running the application B, to update the corresponding anti-accidental touch levels for the different areas. In this way, the anti-accidental touch level of each area that is obtained when the application A is run does not affect the application B, thereby improving accuracy of identifying an accidental touch point (or a misidentification point) by the electronic device in various application scenarios.

It should be noted that in the foregoing two touch control methods provided in the embodiments of the present invention, namely, the touch control method provided in step 101 to step 107 and the touch control method provided in step 201 to step 206, the electronic device can select at least one of the foregoing two signal reporting methods to complete a touch control process. That is, the foregoing two touch control methods may be integrated or combined to use. This may be set by a person skilled in the art according to actual experience or an actual application scenario. The embodiments of the present invention impose no limitation thereon.

In addition, a person skilled in the art may detect touch sensitivity and accuracy on the touchscreen through copper pillar detection or the like. In the embodiments of the present invention, because different touch areas may have different anti-accidental touch levels, touch sensitivity and accuracy on each area obtained through detection may be different. The embodiments of the present invention impose no limitation thereon.

It may be understood that to implement the foregoing functions, the electronic device or the like includes hardware structures and/or software modules for performing the various corresponding functions. A person skilled in the art should be easily aware that, in combination with examples of units and algorithm steps described in the embodiments disclosed in this specification, the embodiments of the present invention can be implemented in a hardware form or a form of a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of the present invention, functional module division may be performed on the electronic device according to the examples of the methods. For example, various functional modules may be divided according to the corresponding functions, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in an actual implementation.

Figure 12:
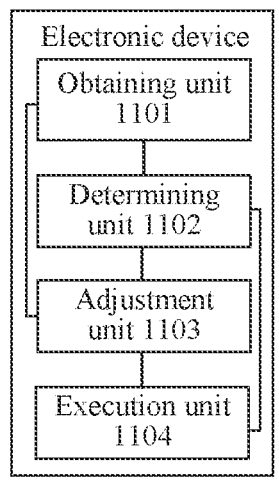
FIG. 12 is a second schematic structural diagram of an electronic device according to an embodiment of the present invention.

When various functional modules are divided according to the corresponding functions, FIG. 12 is a possible schematic structural diagram of the electronic device in the foregoing embodiments. The electronic device includes an obtaining unit 1101, a determining unit 1102, an adjustment unit 1103, and an execution unit 1104.

The obtaining unit 1101 is configured to support the electronic device in performing process 101 to process 103 in FIG. 5 and process 201 in FIG. 9. The determining unit 1102 is configured to support the electronic device in performing process 104 and process 106 in FIG. 5 and process 203 and process 204 in FIG. 9. The adjustment unit 1103 is configured to support the electronic device in performing process 202 and process 206 in FIG. 9. The execution unit 1104 is configured to support the electronic device in performing process 105 and process 107 in FIG. 3 and process 205 in FIG. 9. All related content of the steps in the foregoing method embodiments may be referenced for the function descriptions of the corresponding functional modules. Details are not described herein again.

Figure 13:
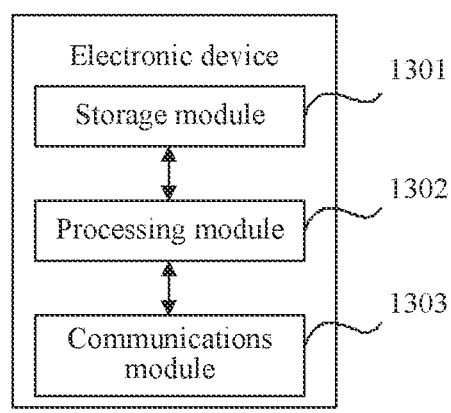
FIG. 13 is a third schematic structural diagram of an electronic device according to an embodiment of the present invention.

When an integrated unit is used, FIG. 13 is a possible schematic structural diagram of the electronic device in the foregoing embodiments. The electronic device includes a processing module 1302 and a communications module 1303. The processing module 1302 is configured to control and manage an operation of the electronic device. The communications module 1303 is configured to support UE in communicating with another network entity. The electronic device may further include a storage module 1301, configured to store program code and data of the electronic device.

The processing module 1302 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or a combination thereof. The controller/processor may implement or execute examples of various logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 1303 may be a transceiver, a transceiver circuit, a communications interface, or the like. The storage module 1301 may be a memory.

Figure 4:
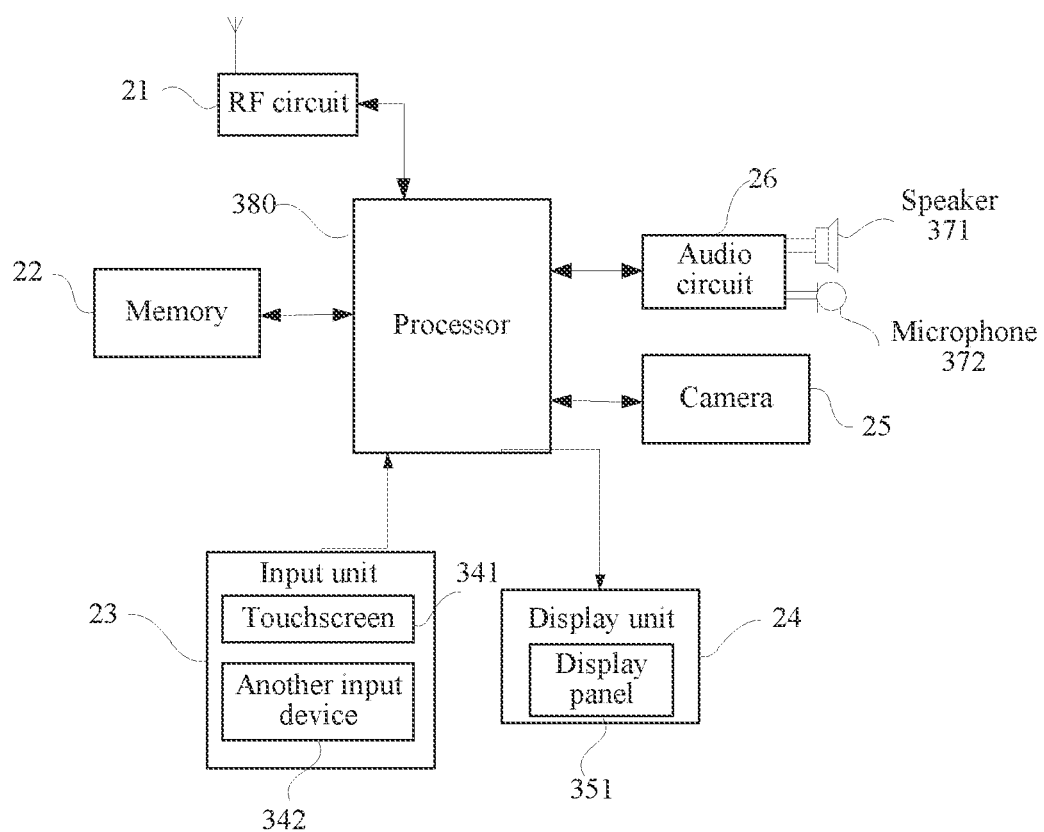
FIG. 4 is a first schematic structural diagram of an electronic device according to an embodiment of the present invention.

When the processing module 1302 is a processor, the communications module 1303 is an RF transceiver circuit, and the storage module 1301 is a memory, the electronic device provided in this embodiment of the present invention may be the electronic device shown in FIG. 4.

All or some of the foregoing embodiments may be implemented by software, hardware, firmware, or any combination thereof. When a software program is used to implement the embodiments, the embodiments may be all or partially implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
obtaining, by an electronic device, a touch event triggered by a user on a touchscreen, wherein the touch event comprises a touch position of a touch point;
in response to a target area where the touch position being located in a first touch area, with the first touch area being associated with a first probability that an accidental touch event occurs in the first touch area, and the first probability being greater than a second probability that an accidental touch event occurs in a second touch area:
determining, by the electronic device, whether the touch point is an accidental touch point; and
in response to determining whether the touch point is the accidental touch point:
discarding, by the electronic device, the touch event when the touch point is the accidental touch point; and
reporting, by the electronic device, the touch event when the touch point is not the accidental touch point; and
in response to the target area where the touch position is located being in the second touch area, reporting, by the electronic device, the touch event, wherein the touchscreen comprises the first touch area and the second touch area, the second touch area is different from the first touch area; and
wherein in response to the touch point being identified as the accidental touch point and after the discarding, by the electronic device, the touch event, the method further comprises:
determining, by the electronic device, whether the touch event is a misidentification event, wherein the misidentification event occurs when the electronic device determines that the touch point is the accidental touch point when the touch point is not an accidental touch point; and
re-sending, by the electronic device, the touch event when the touch event is the misidentification event.

2. The method according to claim 1, wherein the method further comprises:
adjusting, by the electronic device, the target area from the second touch area to the first touch area in response to the electronic device determining no user operation in the target area within a preset time period.

3. The method according to claim 1, wherein after determining, by the electronic device, whether the touch event is the misidentification event, the method further comprises:
when the electronic device determines that the touch event is the misidentification event, obtaining, by the electronic device, a quantity of misidentifications that a misidentification event occurred in the target area within a nearest time period L, wherein L>0; and
adjusting, by the electronic device, the target area from the first touch area to the second touch area when the quantity of misidentifications is greater than a threshold.

4. The method according to claim 1, wherein determining, by the electronic device, whether the touch event is the misidentification event comprises:
obtaining, by the electronic device, historical touch data within a nearest time period T, wherein the historical touch data indicates an actual touch parameter generated for a historical touch point triggered by the user within the nearest time period T, and T>0;
determining, by the electronic device according to the historical touch data, a target anti-misidentification parameter currently used by the electronic device; and
determining, by the electronic device, whether the touch event is the misidentification event according to the target anti-misidentification parameter.

5. The method according to claim 1, wherein determining, by the electronic device, whether the touch point is the accidental touch point comprises:
obtaining, by the electronic device, historical touch data within a nearest time period T, wherein the historical touch data indicates an actual touch parameter generated for a historical touch point triggered by the user within the nearest time period T, and T>0;
determining, by the electronic device according to the historical touch data, a target anti-accidental touch parameter currently used by the electronic device; and
determining, by the electronic device, whether the touch point is the accidental touch point according to the target anti-accidental touch parameter.

6. The method according to claim 1, wherein the touchscreen of the electronic device further comprises a third touch area, wherein a third probability that an accidental touch event occurs in the third touch area is less than the first probability and greater than the second probability; and
when the target area is in the third touch area, the method further comprises:
determining, by the electronic device when the electronic device currently runs a first application in a display interface, whether the touch point is an accidental touch point; or
reporting, by the electronic device, the touch event when the electronic device currently runs a second application in the display interface.

7. A device, comprising:
a processor;
a memory;
a bus; and
a communications interface, wherein:
the memory is configured to store a computer-executable instruction, the processor is connected to the memory by using the bus, and when the device runs, the processor executes the computer-executable instruction stored in the memory, to enable the device to perform the method according to claim 1.

8. A device, comprising:
a touchscreen; and
a processor, configured to:
obtain a touch event triggered by a user on the touchscreen, wherein the touch event comprises a touch position of a touch point;
in response to a target area where the touch position being located in a first touch area, with the first touch area being associated with a first probability that an accidental touch event occurs in the first touch area, and the first probability being greater than a second probability that an accidental touch event occurs in a second touch area:
determine whether the touch point is an accidental touch point; and
in response to determining whether the touch point is the accidental touch point:
discard the touch event when the touch point is the accidental touch point; and
report the touch event when the touch point is not the accidental touch point; and
in response to the target area in which the touch position is located is in the second touch area, report the touch event, wherein the touchscreen comprises the first touch area and the second touch area, the second touch area is different from the first touch area; and
wherein the processor is further configured to:
determine whether the touch event is a misidentification event, wherein the misidentification event occurs when the device determines that the touch point is the accidental touch point when the touch point is not an accidental touch point; and
re-send the touch event when the touch event is the misidentification event.

9. The device according to claim 8, wherein the processor is further configured to adjust the target area from the second touch area to the first touch area in response to the device determining no user operation in the target area within a preset time period.

10. The device according to claim 8, wherein the processor is further configured to:
when the device determines that the touch event is the misidentification event, obtain a quantity of misidentifications that a misidentification event occurred in the target area within a nearest time period L, wherein L>0; and
adjust the target area from the first touch area to the second touch area when the quantity of misidentifications is greater than a threshold.

11. The device according to claim 8, wherein the processor is further configured to:
obtain historical touch data within a nearest time period T, wherein the historical touch data indicates an actual touch parameter generated for a historical touch point triggered by the user within the nearest time period T, and T>0;
determine, according to the historical touch data, a target anti-misidentification parameter currently used by the device; and
determine whether the touch event is the misidentification event according to the target anti-misidentification parameter.

12. The device according to claim 8, wherein the processor is further configured to:
obtain historical touch data within a nearest time period T, wherein the historical touch data indicates an actual touch parameter generated for a historical touch point triggered by the user within the nearest time period T, and T>0;
determine, according to the historical touch data, a target anti-accidental touch parameter currently used by the device; and
determine whether the touch point is the accidental touch point according to the target anti-accidental touch parameter.

13. The device according to claim 8, wherein:
the touchscreen further comprises a third touch area, wherein a third probability that an accidental touch event occurs in the third touch area is less than the first probability and greater than the second probability; and
the processor is further configured to:
in response to the device currently running a first application in a display interface, determine whether the touch point is an accidental touch point; or
in response to the device currently running a second application in a display interface, report the touch event.

14. A non-transitory computer-readable storage medium, wherein the computer-readable storage medium stores an instruction, and when the instruction is run on an electronic device, the electronic device is enabled to perform following steps:
obtaining a touch event triggered by a user on a touchscreen, wherein the touch event comprises a touch position of a touch point;
in response to a target area where the touch position being located in a first touch area, with the first touch area being associated with a first probability that an accidental touch event occurs in the first touch area, and the first probability being greater than a second probability that an accidental touch event occurs in a second touch area:
determining whether the touch point is an accidental touch point; and
in response to determining whether the touch point is the accidental touch point:
discarding the touch event when the touch point is the accidental touch point; and
reporting, by the electronic device, the touch event when the touch point is not the accidental touch point; and
in response to the target area where the touch position is located being in the second touch area, reporting the touch event, wherein the touchscreen comprises the first touch area and the second touch area, the second touch area is different from the first touch area; and
wherein in response to the touch point being identified as the accidental touch point and after the discarding the touch event, the electronic device is further enabled to perform:

determining whether the touch event is a misidentification event, wherein the misidentification event occurs when the electronic device determines that the touch point is the accidental touch point when the touch point is not an accidental touch point; and re-sending the touch event when the touch event is the misidentification event.

15. A non-transitory computer-readable storage medium comprising a computer program product comprising an instruction, wherein when the computer program product is run on an electronic device, the electronic device is enabled to perform following steps:

obtaining a touch event triggered by a user on a touchscreen, wherein the touch event comprises a touch position of a touch point;

in response to a target area where the touch position being located in a first touch area, with the first touch area being associated with a first probability that an accidental touch event occurs in the first touch area, and the first probability being greater than a second probability that an accidental touch event occurs in a second touch area:

determining whether the touch point is an accidental touch point; and in response to determining whether the touch point is the accidental touch point:

discarding the touch event when the touch point is the accidental touch point; and reporting the touch event when the touch point is not the accidental touch point; and in response to the target area where the touch position is located being in the second touch area, reporting the touch event, wherein the touchscreen comprises the first touch area and the second touch area, the second touch area is different from the first touch area; and wherein in response to the touch point being identified as the accidental touch point and after the discarding the touch event, the electronic device is further enabled to perform:

determining whether the touch event is a misidentification event, wherein the misidentification event occurs when the electronic device determines that the touch point is the accidental touch point when the touch point is not an accidental touch point; and re-sending the touch event when the touch event is the misidentification event.

* * * * *